(12) United States Patent
Shankman

(10) Patent No.: US 9,822,008 B2
(45) Date of Patent: *Nov. 21, 2017

(54) PROCESS FOR THE SYNTHESIS OF GRAPHENE AND GRAPHENE DERIVATIVES FROM GREENHOUSE GASES AND OTHER CARBONACEOUS WASTE PRODUCTS

(71) Applicant: Peerless Worldwide, LLC, Sunrise, FL (US)

(72) Inventor: Richard S. Shankman, Palm Beach, FL (US)

(73) Assignee: Peerless Worldwide, LLC, Sunrise, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/000,929

(22) Filed: Jan. 19, 2016

(65) Prior Publication Data

US 2016/0130149 A1 May 12, 2016

Related U.S. Application Data

(63) Continuation of application No. PCT/US2014/046755, filed on Jul. 15, 2014.

(60) Provisional application No. 61/847,351, filed on Jul. 17, 2013.

(51) Int. Cl.
*C01B 31/04* (2006.01)
*B82Y 40/00* (2011.01)

(52) U.S. Cl.
CPC ........ *C01B 31/0446* (2013.01); *C01B 31/043* (2013.01); *B82Y 40/00* (2013.01)

(58) Field of Classification Search
CPC .................. C01B 31/0446; C01B 31/0453
See application file for complete search history.

(56) References Cited

U.S. PATENT DOCUMENTS 8,865,113 B2 * 10/2014 Shankman ............. B82Y 30/00
252/378 R

* cited by examiner

*Primary Examiner* — Richard M Rump
(74) *Attorney, Agent, or Firm* — Nancy J. Flint, Esq.; Nancy J. Flint, Attorney At Law, P.A.

(57) ABSTRACT

Methods and processes are disclosed that utilize carbonates produced as a result of the conversion of carbon dioxide that are heated under conditions inhibiting complete combustion to produce vapors promoting polycyclic aromatic hydrocarbon formation in the formation of graphene, graphene derivatives and other useful nanoparticles as desired. In some embodiments, the waste gasses and streams from processes of extracting or processing carbonaceous materials are collected and refluxed with at least one solvent to promote polycyclic aromatic hydrocarbon formation under conditions that inhibit complete combustion of the carbonaceous material can be used in the production of graphene, graphene derivatives and other useful nanoparticles. In some embodiments, waste gasses from processes of extracting or processing carbonaceous materials are collected and used in the production of graphene, graphene derivatives and other useful nanoparticles.

22 Claims, 2 Drawing Sheets

CO₂ and epoxide    Reaction    Form cyclic carbonate    Feedstock to reflux reaction    Form graphene and and its derivatives

PROCESS FOR THE SYNTHESIS OF GRAPHENE AND GRAPHENE DERIVATIVES FROM GREENHOUSE GASES AND OTHER CARBONACEOUS WASTE PRODUCTS

REFERENCE TO RELATED APPLICATIONS

This application is a PCT of U.S. Provisional Patent Appln. Ser. No. 61/847351 filed on Jul. 17, 2013 and titled PROCESS FOR THE SYNTHESIS OF GRAPHENE AND GRAPHENE DERIVATIVES FROM SO-CALLED GREENHOUSE GASSES AND OTHER CARBONACEOUS WASTE PRODUCTS, the contents of which are herein incorporated by reference in its entirety. This application is further related to U.S. Provisional Application Ser. No. 61/538,528, filed Sep. 23, 2011, entitled "LUBRICATING ADDITIVES, POLISHING COMPOSITIONS, NANOPARTICLES, AND TRIBOLOGICAL COATINGS, AND USES THEREOF, AND METHODS OF NANOPARTICLE, GRAPHENE, AND GRAPHENE OXIDE SYNTHESIS"; U.S. Provisional Application Ser. No. 61/541,637, filed Sep. 30, 2011, entitled "LUBRICATING ADDITIVES, POLISHING COMPOSITIONS, NANOPARTICLES, AND TRIBOLOGICAL COATINGS, AND USES THEREOF, AND METHODS OF NANOPARTICLE, GRAPHENE, AND GRAPHENE OXIDE SYNTHESIS"; U.S. Provisional Application Ser. No. 61/546,368, filed Oct. 12, 2011, entitled "COMBUSTION SYNTHESIS OF GRAPHENE OXIDE AND GRAPHENE"; U.S. Provisional Patent Application Ser. No. 61/568,957, filed Dec. 9, 2011 and entitled "SYNTHESIS OF GRAPHENE, GRAPHENE DERIVATIVES, CARBON-ENCAPSULATED METALLIC NANOPARTICLES, AND NANO-STEEL, AND THE USE OF SEQUESTERED CARBONACEOUS WASTES AND GREENHOUSE GASSES IN SUCH SYNTHESIS METHODS"; U.S. Provisional Patent Application Ser. No. 61/579993, filed Dec. 23, 2011 and entitled "GRAPHENE AND GRAPHENE DERIVATIVES SYNTHESIS BY DEHYDRATION OR PYROLYSIS OF CARBONACEOUS MATERIALS, VAPOR EXFOLIATION OR PAH FORMATION, AND SUBSEQUESTNT HYDROPHOBIC SELF-ASSEMBLY"; U.S. Provisional Patent Application Ser. No. 61/596936, filed Feb. 9, 2012 and entitled "TRIBOLOGICALLY BENEFICIAL CARBONACEOUS MATERIALS AND NANO-ABRASIVE LUBRICANT MOLECULES FROM INTENTIONAL IN-SITU PYROLYSIS OF SACRAFICIAL CYCLIC CARBON CONSTITUENTS"; PCT Application Serial Number PCT/US2012/29276, filed Mar. 15, 2012 and entitled "FACILE SYNTHESIS OF GRAPHENE, GRAPHENE DERIVATIVES AND ABRASIVE NANOPARTICLES AND THEIR VARIOUS USES, INCLUDING AS TRIBOLOGICALLY-BENEFICIAL LUBRICANT ADDITIVE"; U.S. patent application Ser. No. 13/583,507, filed Sep. 7, 2012 and entitled "FACILE SYNTHESIS OF GRAPHENE, GRAPHENE DERIVATIVES AND ABRASIVE NANOPARTICLES AND THEIR VARIOUS USES, INCLUDING AS TRIBOLOGICALLY-BENEFICIAL LUBRICANT ADDITIVE"; and U.S. patent application Ser. No. 14/264,360, filed Apr. 29, 2014 and entitled "FACILE SYNTHESIS OF GRAPHENE, GRAPHENE DERIVATIVES AND ABRASIVE NANOPARTICLES AND THEIR VARIOUS USES, INCLUDING AS TRIBOLOGICALLY-BENEFICIAL LUBRICANT ADDITIVE" (the "Related Applications"). The aforementioned Related Applications are hereby incorporated herein by reference.

BACKGROUND OF THE INVENTION

Field of the Invention

The invention pertains to the field of the use of environmentally destructive or otherwise undesirable waste fumes, gasses and streams for economically constructive purposes. More specifically, the invention pertains to the use of such waste fumes, gasses and streams in the production of graphene, graphene derivatives and other nanoparticles.

Description of Related Art

There are currently methods known to the art for producing graphene and other useful graphitic nanoparticles through the use of both solid carbon dioxide ("dry ice") and gaseous carbon dioxide ($CO_2$), (see, for example in the first case, Chakrabati et al., "Conversion of carbon dioxide to few-layer graphene," *J. Mater. Chem.*, Vol. 21, pp. 9491-9493, 2011; Jeon et al., "Edge-carboxylated graphene nanosheets via ball milling," *Proc. of the Nat. Acad. of Sci.*, Vol. 109, No. 15, pp. 5588-5593, 2012; and in the second case, U.S. Pat. No. 8,420,042, entitled "Process for the production of carbon graphenes and other nanomaterials" by Dickenson et al., Apr. 16, 2013). Those methods employing gaseous $CO_2$ as a substrate aspire to use potentially environmentally harmful industrial emissions of $CO_2$ as the feedstock, thereby helping to reduce greenhouse gas emissions into the atmosphere. Although well-intentioned, these methods currently known to the art either employ expensive reactants or use potentially dangerous catalyst materials (such as violently reactive elemental earth metals), but all produce end-products themselves of little commercial value. In the case of U.S. Pat. No. 8,420,042 supra, the reduction of $CO_2$ is accomplished using highly reactive and unstable elemental magnesium. These current efforts at chemical reduction of $CO_2$ to useful precursor materials are also universally marred by significant economic challenges.

Other troublesome so-called greenhouses gasses include methane, ethane and propane. Copious amounts of methane-related gasses are released into the atmosphere as a result of natural gas exploration, drilling, extraction and processing; most notably from the process of induced hydraulic fracturing (a/k/a "hydrofracking" or more commonly "fracking"), see Jeff Tollefson, "Air sampling reveals high emissions from gas field," *Nature*, 482, pp. 139-140, 2012; Mark Fischetti, "Fracking Would Emit Large Quantities of Greenhouse Gasses," *Scientific American*, Jan. 20, 2012. It is also known that both methane and ethane can be used as a starting material in the production of graphene. See Wassei et al., "Chemical Vapor Deposition of Graphene on Copper from Methane, Ethane and Propane: Evidence of Bilayer Selectivity," *Small*, vol. 8, issue 9, pp. 1415-1422, 2012.

Although there are many carbon dioxide sequestration/utilization methods known to the art, such as those described in: Hydrogenation of $CO_2$ to synthetic methanol (see Wesselbaum, et al., "Hydrogenation of Carbon Dioxide to Methanol by Using a Homogeneous Ruthenium-Phosphate Catalyst," *Angewante Chemie*, Vol. 51, Issue 30, pp. 7499-7502, 2012, Yang et al., "Fundamental studies of methanol synthesis from $CO_2$ hydrogenation on Cu(111), Cu clusters, and Cu/ZnO(0001)," *Phys. Chem. Chem. Phys.*, Vol. 12, pp. 9909-9917, 2010, and Meyer Steinberg, *Brookhaven National Lab Report Number 63316: The Carnol Process System for CO2 Mitigation and Methanol Production*, Department of Advanced Technology, Brookhaven National Laboratory, Upton, N.Y.; M. Steinberg, "The Carnol Process for $CO_2$ Mitigation and Methanol Production," *Energy*, Vol. 22, Issues 2-3, pp. 143-149, 1997; M. Hallmann and M. Steinberg, *Greenhouse Gas Carbon Dioxide Mitigation:*

Science and Technology, CRC Press, LLC, Boca Raton, Fla., 1999; C. Creutz and E. Fujita, *Carbon Management: Implications for R&D in the Chemical Sciences and Technology: A Workshop Report to the Chemical Sciences Roundtable*, National Academies Press, Washington, D.C., 2001); Conversion of $CO_2$ to methanol via specialized algae; Conversion of $CO_2$ to methanol via enzymes; Solar conversion of $CO_2$ to methanol; Conversion of $CO_2$ to salicylic acid (see T. Lijima and T. Yamaguchi, "$K_2CO_3$-Catalyzed direct synthesis of salicylic acid from phenol and supercritical CO2," *Applied Catalysis A: General*, Vol. 345, Issue 1, pp. 12-17, 2008); Conversion of $CO_2$ to ethylene carbonate (see, North et al., "A Gas-Phase Flow Reactor for Ethylene Carbonate Synthesis from Waste Carbon Dioxide," *Chemistry—A European Journal*, Vol. 15, Issue 43, pp. 11454-11347, 2009), etc, widespread implementation of all of these methods is marred by a financial hurdle owing to the low economic value of the most common end-product—synthetic methanol—an otherwise abundant and cheap material.

Besides traditional $CO_2$ emissions from smokestacks, there are many other potentially harmful environmental releases of carbonaceous gasses or hydrocarbon-laden waste water from processes such as concrete asphalting, roof tarring, oil well drilling, natural gas well drilling, natural gas processing, torrefaction of biomass, gassification of coal, wood gassification and virtually any process involving the complete or partial hydrothermal carbonization of carbonaceous material.

Carbonaceous waste streams are also created when materials such as shale gas, tight gas, tight oil, and coal seam gas are extracted from the earth during fracking in which water and chemical additives are pumped into a geologic formation at high pressure. When the pressure exceeds the rock strength, the fluids open fractures and a propping agent is pumped into the fractures to keep them from closing when the pumping pressure is released. The internal pressure created within the geologic formation causes the injected fracturing fluids to rise to the surface where it can be recovered and stored in tanks or pits. Currently, flowback is typically discharged into surface water or injected underground. VOCs believed to be released as a result of fracking and natural gas processing are reported to include the following, all of which are believed to be excellent feedstock for graphene production using the invention:

1,2-Cyclohexane Dicarboxylic Acid Diisononyl Ester (Hexamoll ® DINCH ®)
1,2,4-Trimethylbenzene
1,3,5 Trimethylbenzene
2-methyl-4-isothiazolin-3-one
5-chloro-2-methyl-4-isothiazotin-3-one
Aromatic Hydrocarbon
Aromatic Ketones
Dazomet
Diesel
Di-2-ethylhexyl Phthalate (DEHP)
Diethylbenzene
Diisodecyl Phthalate (DIDP)
Diisononyl Phthalate (DINP)
Doclecylbenzene Sulfonic Acid
Ethoxylated Octylphenol
Ethylbenzene
Kerosene
Naphthalene
Oil Mist
Petroleum Distillate Blend
Petroleum Distillates
Petroleum Naphtha
Polysaccharide
Propargyl Alcohol -continued Sucrose
Toluene
Xylene See, e.g., *Chemicals Used by Hydraulic Fracturing Companies in Pennsylvania For Surface and Hydraulic Fracturing Activities*, prepared by the U.S. Department of Environmental Protection, Bureau of Oil and Gas Management, Washington D.C., Jun. 30, 2010.

It is believed that many, if not all, of these aforementioned processes create waste vapors and streams that already contain some quantity of recoverable and useful graphene, graphene derivatives (such as graphene oxide) or polycyclic aromatic hydrocarbons (PAHs) that may be used (collected) without further processing, or may require minimal processing, to produce a commercially-viable product stream.

The Related Applications disclose economical dehydration reactions and/or reflux pyrolysis methods to form graphitic carbon from a carbonaceous material carbon source. The disclosed reactions and methods subject carbonaceous materials to reflux pyrolysis, oxidation/reduction, incomplete combustion or acid dehydration to form graphitic carbon reactant starting materials wherein, following refluxing, graphene/graphene oxide (GO) is emitted as nanoscopic scales or "nanoscales" suspended in a vapor/steam. The resulting graphene/GO scales can travel in the vapor and be collected either by direct deposition onto a solid substrate in physical contact with the emitted vapor, or by applying the particle-containing vapor to an aqueous solution or liquid used to promote "hydrophobic self-assembly" of the scales into larger graphene/GO sheets. In one embodiment, the reaction environment is controlled to limit the amount of ambient oxygen (O2) in the chamber, discouraging complete combustion of the reactants during heating. In one embodiment, the reaction is carried out in the presence of an added solvent. In one embodiment, the produced GO is converted to reduced graphene oxide (rGO) or graphene sheets suspended in a heated or unheated liquid collection medium.

As disclosed in the Related Applications, the carbonaceous starting material may be subjected to a dehydration reaction or pyrolysis to form graphitic carbon, and/or the carbonaceous starting material may be in whole or in part graphitic.

SUMMARY OF THE INVENTION

In one embodiment, the method of the invention utilizes greenhouse and other carbonaceous waste gasses and streams to create carbonaceous starting material for use as a feedstock for the reactions and methods disclosed in the Related Applications to produce highly useful and valuable graphene and its derivatives from those otherwise low value materials.

In one embodiment of the invention, waste vapors from processes such as concrete asphalting, roof tarring, oil well drilling, natural gas well drilling, natural gas processing, torrefaction of biomass, gassification of coal, wood gassification and virtually any process involving the complete or partial hydrothermal carbonization of carbonaceous material can be used as a feedstock for the reactions and methods disclosed in the Related Applications to produce highly useful and valuable graphene and its derivatives from those otherwise low value materials.

In one embodiment of the invention, waste vapors from processes such as concrete asphalting, roof tarring, oil well drilling, natural gas well drilling, natural gas processing, torrefaction of biomass, gassification of coal, wood gassification and virtually any process involving the complete or partial hydrothermal carbonization of carbonaceous material can be directed to an aqueous solution or liquid used to promote "hydrophobic self-assembly" of the scales into larger graphene/GO sheets.

In one embodiment of the invention, waste streams from extraction techniques such as fracking can be used as a feedstock for the reactions and methods disclosed in the Related Applications to produce highly useful and valuable graphene and its derivatives from those otherwise low value materials.

By producing highly valuable graphene, graphene derivatives and other valuable nanoparticles (including nanoabrasives), the invention seeks to shift the economics of many of these existing technologies by producing valuable end-products while simultaneously allowing widespread implementation to meaningfully curb harmful carbonaceous gas emissions into the atmosphere.

DETAILED DESCRIPTION OF THE INVENTION

Figure 1:
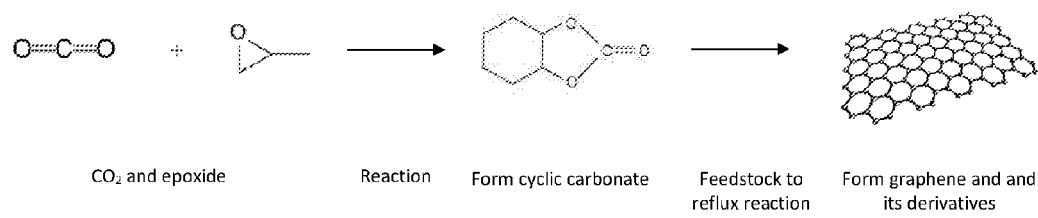
FIG. 1 shows a schematic of a synthesis process according to one embodiment of the present invention.
Figure 2:
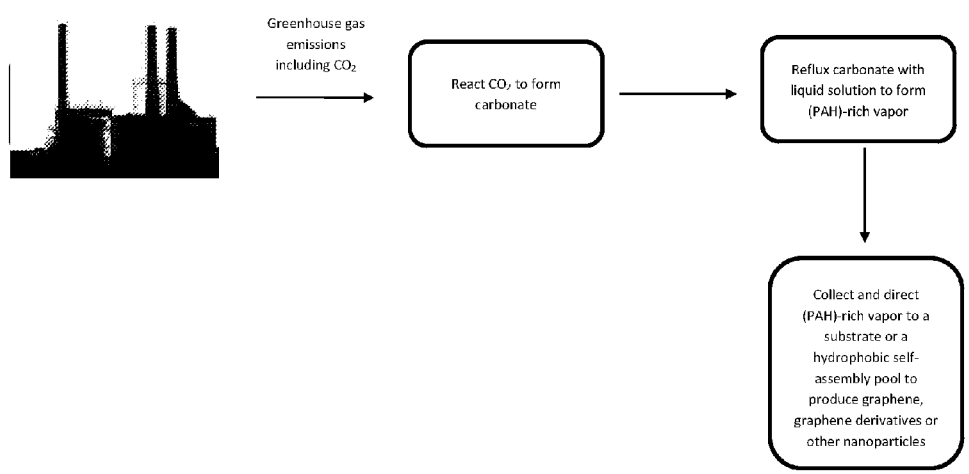
FIG. 2 shows a flowscheme of a synthesis and collection system in an embodiment of the present invention.

As disclosed in the Related Applications, cyclic carbon-containing hydrocarbon molecules with incorporated oxygen heteroatoms (like sucrose) appear particularly well-suited for hydrothermal carbonization via reflux synthesis to form graphene/GO and their various derivatives.

For example, cis-cyclohexene carbonate and sucrose each comprise both a six-membered and five-membered ring with incorporated oxygen heteroatoms within at least one of the rings, and an absence of other potentially contaminating heteroatoms such as nitrogen, fluorine, sulfur, chlorine, phosphorus or metals.

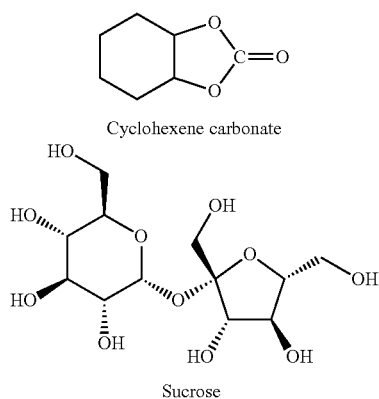

It is believed that when this class of molecules (cyclic carbonates) are combined in a reflux chamber with water and alcohols of the reactions and methods disclosed in the Related Applications, they will perform substantially similar to sucrose and other cyclic carbonaceous feedstocks in the facile production of graphene/GO and their derivatives. As cyclic carbonates are capable of being produced from $CO_2$ via a number of processes already known to the art, use of those carbonates as feedstock according to the invention should overcome the current hurdles in the state of the art and make economically-viable carbon sequestration a reality.

In one embodiment of the invention, $CO_{2(g)}$ is reacted with a highly-reactive epoxide known to the art for such purpose, such as readily available 1,2-propylene oxide, to produce a cyclic carbonate, including but not limited to Cis-cyclohexene carbonate.

The aforementioned reaction to produce a precursor (feedstock) cyclohexene carbonate for the present invention is known to the art (see, for example, Darensbourg, et al., "The Catalytic Activity of a Series of Zn(II) Phenoxides for the Copolymerization of Epoxides and Carbon Dioxide," *J. Amer. Chem. Soc.*, Vol 121, pp. 107-116, 1999), and proceeds as essentially represented in Equation 1:

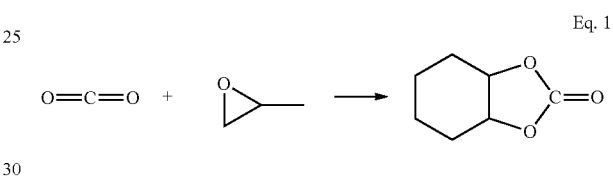

Eq. 1

The resulting Cis-cyclohexene carbonate (a cyclic carbon-containing hydrocarbon molecule with incorporated oxygen heteroatoms) can then be combined (as carbonaceous feedstock) with a liquid boiling solution and refluxed under mild vacuum conditions to produce a polycyclic aromatic hydrocarbon (PAH)-rich vapor, that is then collected and either directed to a substrate or channeled to a hydrophobic self-assembly pool to produce graphene, graphene derivatives or other nanoparticles as desired, as disclosed in the Related Applications.

In another related embodiment of the invention, $CO_{2(g)}$ can be reacted with a propargyl alcohol to produce a carbonate, such as a methylene cyclic carbonate (see Gu et al., "Ionic Liquid as an Efficient Promoting Medium for Fixation of $CO_2$: Clean Synthesis of r-Methlene Cyclic Carbonates from $CO_2$ and Propargyl Alcohols Catalyzed by Metal Salts under Mild Conditions," *J. Org. Chem.*, Vol. 69 (2), pp. 391-394, 2004). The resulting cyclic carbonate (a cyclic carbon-containing hydrocarbon molecule with incorporated oxygen heteroatoms) is then combined (as carbonaceous feedstock) with a liquid boiling solution of the present invention and refluxed under mild vacuum conditions to produce a polycyclic aromatic hydrocarbon (PAH)-rich vapor, that is then collected and either directed to a substrate or channeled to a hydrophobic self-assembly pool to produce graphene, graphene derivatives or other nanoparticles as desired, as disclosed in the Related Applications.

There are likewise chemical and structural similarities between styrene carbonate and sucrose:

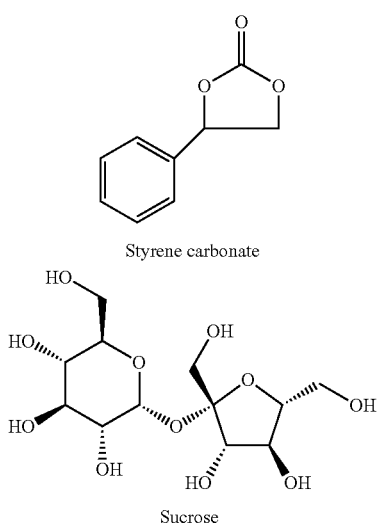

Styrene carbonate

Sucrose

In another embodiment of the invention, $CO_{2(g)}$ is reacted with a styrene oxide to produce a styrene carbonate. The aforementioned reaction to produce a precursor (feedstock) styrene carbonate for the invention is known to the art (see, for example, Zhu, et al., "Catalytic activity of ZIF-8 in the synthesis of stryrene carbonate from $CO_2$ and styrene oxide," *Catalysis Communications*, Vol 32, pp. 36-40, 2013), and proceeds as essentially represented in Equation 2:

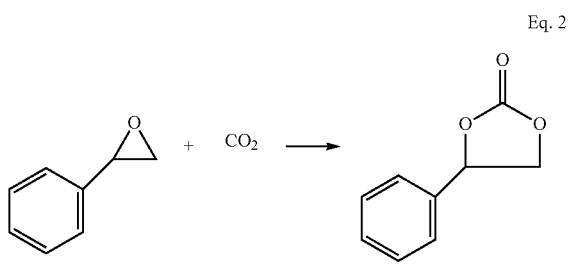

Eq. 2

The resulting styrene carbonate (a cyclic carbon-containing hydrocarbon molecule with incorporated oxygen heteroatoms) can then be combined (as carbonaceous feedstock) with a liquid boiling solution and refluxed under mild vacuum conditions to produce a polycyclic aromatic hydrocarbon (PAH)-rich vapor, that is then collected and either directed to a substrate or channeled to a hydrophobic self-assembly pool to produce graphene, graphene derivatives or other nanoparticles as desired, as disclosed in the Related Applications.

In another embodiment of the invention, $CO_{2(g)}$ can be reacted with a highly-reactive epoxide known to the art for such purpose to produce a salicylate, including but not limited to salicylic acid. The resulting salicylic acid (a cyclic carbon-containing hydrocarbon molecule with incorporated oxygen heteroatoms) can then be combined (as carbonaceous feedstock) with a liquid boiling solution and refluxed under mild vacuum conditions to produce a polycyclic aromatic hydrocarbon (PAH)-rich vapor, that can then be collected and either directed to a substrate or channeled to a hydrophobic self-assembly pool to produce graphene, graphene derivatives or other nanoparticles as desired, as disclosed in the Related Applications.

In another embodiment of the invention, $CO_{2(g)}$ can be reacted with a highly-reactive epoxide known to the art for such purpose to produce a cyclic carbonate, including but not limited to ethylene carbonate. The resulting ethylene carbonate (a cyclic carbon-containing hydrocarbon molecule with incorporated oxygen heteroatoms) can then be combined (as carbonaceous feedstock) with a liquid boiling solution of the present invention and refluxed under mild vacuum conditions to produce a polycyclic aromatic hydrocarbon (PAH)-rich vapor, that can then be collected and either directed to a substrate or channeled to a hydrophobic self-assembly pool to produce graphene, graphene derivatives or other nanoparticles as desired, as disclosed in the Related Applications.

In another embodiment of the invention, $CO_{2(g)}$ can be reacted with a highly-reactive epoxide known to the art for such purpose to produce a styrene carbonate. The resulting styrene carbonate (a cyclic carbon-containing hydrocarbon molecule with incorporated oxygen heteroatoms) can then be combined (as carbonaceous feedstock) with a liquid boiling solution of the present invention and refluxed under mild vacuum conditions to produce a polycyclic aromatic hydrocarbon (PAH)-rich vapor, that is then collected and either directed to a substrate or channeled to a hydrophobic self-assembly pool to produce graphene, graphene derivatives or other nanoparticles as desired, as disclosed in the Related Applications.

Today, in processes involving the complete or partial hydrothermal carbonization of carbonaceous material, hydrocarbon vapors may be destroyed in a device such as a flare, combustor or a thermal oxidizer as an alternative to recovery. In such devices, the vapor mixture flows into a vapor collection system at a loading facility and through a vapor header connecting the loading facility with a vapor combustion unit ("VCU"). The vapor mixture flows to burner elements where the combustible vapors are ignited by a pilot and burned.

As an alternative to "flaring," vapor recovery units ("VRUs") are known that can be used to collect vapors. For example, VRUs are used today in the oil and gas industry for purposes of "casing head gas capture," as a means of recovering natural gas vapor (i.e., "fugitive methane") escaping from wellheads. A VRU typically comprises a scrubber, a compressor and a switch which recover vapors, compress the gas and convert the recovered vapors into a usable product. Alternatively, the recovered vapors can be stored for later use.

In one embodiment of the invention, torrefaction waste gasses (that is to say the vapors created from the removal of moisture and volatiles from wood and other biomass to create a fuel char) can be collected according to methods known today (such as and then combined with a liquid boiling solution and refluxed under mild vacuum conditions to produce a PAH-rich vapor, that is then collected and either directed to a substrate or channeled to a hydrophobic self-assembly pool to produce graphene, graphene derivatives or other nanoparticles as desired, as disclosed in the Related Applications.

In another embodiment, torrefaction waste gasses containing the moisture and volatiles removed from wood and other biomass, believed to contain certain amounts of already formed graphene and graphene derivatives in the resulting vapor stream, can be collected and directed to a substrate or channeled to a hydrophobic self-assembly pool as described in the Related Applications to produce graphene, graphene derivatives or other nanoparticles as desired.

In another embodiment, soot containing waste emissions from industrial or other processes can be collected and then combined with a liquid boiling solution and refluxed under mild vacuum conditions to produce a PAH-rich vapor, that is then collected and either directed to a substrate or channeled to a hydrophobic self-assembly pool to produce graphene, graphene derivatives or other nanoparticles as desired, as disclosed in the Related Applications.

In another embodiment, soot containing waste emissions from industrial or other processes, believed to contain certain amounts of already formed graphene and graphene derivatives in the resulting vapor stream, can be collected and directed to a substrate or channeled to a hydrophobic self-assembly pool as described in the Related Applications to produce graphene, graphene derivatives or other nanoparticles as desired.

In another embodiment, gasses resulting from wood or other biomass gassification (the process by which wood or other biomass is converted into a synthetic fuel gas of methane and hydrogen) can be collected and then combined with a liquid boiling solution and refluxed under mild vacuum conditions to produce a PAH-rich vapor, that is then collected and either directed to a substrate or channeled to a hydrophobic self-assembly pool to produce graphene, graphene derivatives or other nanoparticles as desired, as disclosed in the Related Applications.

In another embodiment, partially combusted gassification gasses, believed to contain certain amounts of already formed graphene and graphene derivatives in the resulting vapor stream, can be collected and directed to a substrate or channeled to a hydrophobic self-assembly pool as described in the Related Applications to produce graphene, graphene derivatives or other nanoparticles as desired.

In another embodiment, waste gasses and vapors resulting from tar production or processing can be collected and then combined with a liquid boiling solution and refluxed under mild vacuum conditions to produce a PAH-rich vapor, that is then collected and either directed to a substrate or channeled to a hydrophobic self-assembly pool to produce graphene, graphene derivatives or other nanoparticles as desired, as disclosed in the Related Applications.

In another embodiment, waste gasses and vapors resulting from tar production or processing, believed to contain certain amounts of already formed graphene and graphene derivatives in the resulting vapor stream, can be collected and directed to a substrate or channeled to a hydrophobic self-assembly pool as described in the Related Applications to produce graphene, graphene derivatives or other nanoparticles as desired.

In another embodiment, waste gasses and vapors resulting from tar sands processing can be collected and then combined with a liquid boiling solution and refluxed under mild vacuum conditions to produce a PAH-rich vapor, that is then collected and either directed to a substrate or channeled to a hydrophobic self-assembly pool to produce graphene, graphene derivatives or other nanoparticles as desired, as disclosed in the Related Applications.

In another embodiment, waste gasses and vapors resulting from tar sands processing, believed to contain certain amounts of already formed graphene and graphene derivatives in the resulting vapor stream, can be collected and directed to a substrate or channeled to a hydrophobic self-assembly pool as described in the Related Applications to produce graphene, graphene derivatives or other nanoparticles as desired.

In another embodiment, waste gasses and vapors resulting from oil shale processing can be collected and then combined with a liquid boiling solution and refluxed under mild vacuum conditions to produce a PAH-rich vapor, that is then collected and either directed to a substrate or channeled to a hydrophobic self-assembly pool to produce graphene, graphene derivatives or other nanoparticles as desired, as disclosed in the Related Applications.

In another embodiment, oil shale processing waste gasses, believed to contain certain amounts of already formed graphene and graphene derivatives in the resulting vapor stream, can be collected and directed to a substrate or channeled to a hydrophobic self-assembly pool as described in the Related Applications to produce graphene, graphene derivatives or other nanoparticles as desired.

In another embodiment, waste gasses and vapors resulting from coal gassification can be collected and then combined with a liquid boiling solution and refluxed under mild vacuum conditions to produce a PAH-rich vapor, that is then collected and either directed to a substrate or channeled to a hydrophobic self-assembly pool to produce graphene, graphene derivatives or other nanoparticles as desired, as disclosed in the Related Applications.

In another embodiment, waste gasses and vapors resulting from coal gassification, believed to contain certain amounts of already formed graphene and graphene derivatives in the resulting vapor stream, can be collected and directed to a substrate or channeled to a hydrophobic self-assembly pool as described in the Related Applications to produce graphene, graphene derivatives or other nanoparticles as desired.

In another embodiment, waste gasses and vapors resulting from oil and gas drilling can be collected and then combined with a liquid boiling solution and refluxed under mild vacuum conditions to produce a PAH-rich vapor, that is then collected and either directed to a substrate or channeled to a hydrophobic self-assembly pool to produce graphene, graphene derivatives or other nanoparticles as desired, as disclosed in the Related Applications. Where the gasses include non-aromatic compounds such as methane, ethane and propane, hydrogen gas may be introduced as a reactant to the reaction chamber to produce graphene, graphene derivatives or other nanoparticles as desired, according to the methods disclosed in the Related Applications.

In another embodiment, waste gasses and vapors resulting from fracking can be collected and then combined with a liquid boiling solution and refluxed under mild vacuum conditions to produce a PAH-rich vapor, that is then collected and either directed to a substrate or channeled to a hydrophobic self-assembly pool to produce graphene, graphene derivatives or other nanoparticles as desired, as disclosed in the Related Applications.

In another embodiment, waste streams such as flowback resulting from fracking can be collected and then combined with a liquid boiling solution and refluxed under mild vacuum conditions to produce a PAH-rich vapor, that is then collected and either directed to a substrate or channeled to a hydrophobic self-assembly pool to produce graphene, graphene derivatives or other nanoparticles as desired, as disclosed in the Related Applications.

What is claimed is:

1. A method of graphene synthesis comprising:
   a) reacting carbon dioxide with a reactant to form a cyclic carbonate;
   b) refluxing a reaction mixture comprising at least one solvent and carbonaceous material comprising the cyclic carbonate promoting polycyclic aromatic hydrocarbon formation under conditions that inhibit complete combustion of the carbonaceous material;

c) thereafter collecting vapors produced by the reflux of the reaction mixture;
d) directing the vapors to a substrate, whereupon graphene is deposited on the surface of the substrate; and
e) recovering graphene from the surface of the substrate.

2. The method of claim 1, wherein the reactant comprises an epoxide.

3. The method of claim 2, wherein the epoxide comprises 1, 2-propylene oxide.

4. The method of claim 2, wherein the cyclic carbonate comprises cyclohexene carbonate.

5. The method of claim 2, wherein the cyclic carbonate comprises ethylene carbonate.

6. The method of claim 2, wherein the cyclic carbonate comprises styrene carbonate.

7. The method of claim 2, wherein the cyclic carbonate comprises a salicylate.

8. The method of claim 7, wherein the cyclic carbonate comprises salicylic acid.

9. The method of claim 1, wherein the reactant comprises propargyl alcohol.

10. The method of claim 9, wherein the cyclic carbonate comprises methylene cyclic carbonate.

11. The method of claim 10, wherein the solvent comprises a product of heating of the carbonaceous material.

12. A method of graphene oxide synthesis comprising:
a) reacting carbon dioxide with a reactant to form a cyclic carbonate;
b) refluxing a reaction mixture comprising at least one solvent, at least one oxidizer and carbonaceous material comprising the cyclic carbonate promoting polycyclic aromatic hydrocarbon formation under conditions that inhibit complete combustion of the carbonaceous material;
c) thereafter collecting vapors produced by the reflux of the reaction mixture;
d) directing the vapors to a substrate, whereupon graphene oxide is deposited on the surface of the substrate; and
e) recovering graphene oxide from the surface of the substrate.

13. The method of claim 12, wherein the reactant comprises an epoxide.

14. The method of claim 13, wherein the epoxide comprises 1, 2-propylene oxide.

15. The method of claim 13, wherein the cyclic carbonate comprises cyclohexene carbonate.

16. The method of claim 13, wherein the cyclic carbonate comprises ethylene carbonate.

17. The method of claim 13, wherein the cyclic carbonate comprises styrene carbonate.

18. The method of claim 13, wherein the cyclic carbonate comprises a salicylate.

19. The method of claim 18, wherein the cyclic carbonate comprises salicylic acid.

20. The method of claim 12, wherein the reactant comprises propargyl alcohol.

21. The method of claim 20, wherein the cyclic carbonate comprises methylene cyclic carbonate.

22. The method of claim 12, wherein the solvent comprises a product of heating of the carbonaceous material.

* * * * *